(12) United States Patent
Dal Prà

(10) Patent No.: US 10,676,150 B2
(45) Date of Patent: Jun. 9, 2020

(54) INTEGRATED DRIVE FOR BICYCLE HANDLEBARS

(71) Applicant: Campagnolo S.r.l., Vicenza (IT)

(72) Inventor: Giuseppe Dal Prà, Zanè-VI (IT)

(73) Assignee: CAMPAGNOLO S.R.L., Vincenza (IT)

( * ) Notice: Subject to any disclaimer, the term of this patent is extended or adjusted under 35 U.S.C. 154(b) by 90 days.

(21) Appl. No.: 14/547,567

(22) Filed: Nov. 19, 2014

(65) Prior Publication Data

US 2015/0135881 A1    May 21, 2015

(30) Foreign Application Priority Data

Nov. 20, 2013 (IT) .............................. MI2013A1933

(51) Int. Cl.
| | |
|---|---|
| *B62L 3/00* | (2006.01) |
| *B62L 3/02* | (2006.01) |
| *B62M 25/08* | (2006.01) |
| *B62K 23/02* | (2006.01) |
| *F16D 121/02* | (2012.01) |

(52) U.S. Cl.
CPC .............. *B62L 3/023* (2013.01); *B62K 23/02* (2013.01); *B62M 25/08* (2013.01); *F16D 2121/02* (2013.01); *Y10T 74/20396* (2015.01)

(58) Field of Classification Search
CPC ........ B62K 23/02; B62K 23/06; B62K 19/38; B62L 3/02; B62L 3/023; B62L 3/026; B62M 9/122; B62M 9/132; B62M 25/02; B62M 25/04; B62M 25/08; F16D 2121/02; Y10T 74/20396; Y10T 74/20438; Y10T 74/20414; Y10T 74/2042; Y10T 74/20024; Y10T 74/2003; Y10T 74/20037; Y10T 16/466
USPC ...................... 74/491, 502.2, 473.12, 473.13; 188/24.11, 344
See application file for complete search history.

(56) References Cited

U.S. PATENT DOCUMENTS

| | | | |
|---|---|---|---|
| 5,832,782 | A | 11/1998 | Kawakami |
| 5,941,125 | A | 8/1999 | Watarai et al. |

(Continued)

FOREIGN PATENT DOCUMENTS

| | | |
|---|---|---|
| CN | 1550405 A | 12/2004 |
| CN | 1880161 A | 12/2006 |

(Continued)

OTHER PUBLICATIONS

Italian Search Report and Written Opinion in Italian Application No. IT MI2013A001933, Jun. 13, 2014 with English translation.

(Continued)

*Primary Examiner* — Victor L MacArthur
(74) *Attorney, Agent, or Firm* — Volpe and Koenig, P.C.

(57) ABSTRACT

An integrated drive for bicycle handlebars comprising a grip body having a shape and size suitable for being gripped by the cyclist in a holding condition while riding, a brake lever carried by the grip body, a hydraulic system mounted inside the grip body and mechanically actuated by the brake lever to send pressurised fluid into a braking system, and a set of gearshift drives, on said grip body. Such a drive, which encloses in the same grip body not only all that is needed to drive the hydraulic brake, but also drives for the gearshift and allows the overall bulk to be significantly reduced.

12 Claims, 6 Drawing Sheets

(56) References Cited

U.S. PATENT DOCUMENTS

| | | | |
|---|---|---|---|
| 7,204,088 B2 | 4/2007 | Uchiyama et al. | |
| 8,035,046 B2* | 10/2011 | Perini | B62K 23/02 200/61.88 |
| 8,201,670 B2* | 6/2012 | Tetsuka | B62L 3/023 188/24.22 |
| 8,272,292 B2* | 9/2012 | De Perini | B62K 23/02 74/502.2 |
| 8,464,844 B2 | 6/2013 | Jordan | |
| 2002/0104401 A1 | 8/2002 | Dal Pra | |
| 2003/0000333 A1 | 1/2003 | Kawakami | |
| 2003/0019712 A1 | 1/2003 | Dal Pra | |
| 2004/0163486 A1 | 8/2004 | Irie et al. | |
| 2004/0237696 A1 | 12/2004 | Hilsky et al. | |
| 2005/0109148 A1 | 5/2005 | Tsumiyama | |
| 2006/0185360 A1 | 8/2006 | Takizawa et al. | |
| 2008/0168856 A1 | 7/2008 | Tetsuka | |
| 2009/0031841 A1* | 2/2009 | Tetsuka | B62K 23/06 74/473.12 |
| 2010/0199798 A1* | 8/2010 | Uno | B60T 7/102 74/491 |
| 2012/0160625 A1* | 6/2012 | Jordan | B60T 7/102 188/344 |
| 2012/0247264 A1 | 10/2012 | Tetsuka | |
| 2012/0318095 A1* | 12/2012 | Fukao | B62K 23/06 74/502.2 |
| 2013/0031998 A1* | 2/2013 | Miki | B62M 25/04 74/473.12 |
| 2013/0277162 A1* | 10/2013 | Nago | B62L 3/023 188/344 |
| 2014/0144275 A1 | 5/2014 | Kariyama et al. | |
| 2014/0174236 A1 | 6/2014 | Nakakura et al. | |
| 2014/0174866 A1* | 6/2014 | Matsushita | B62K 23/06 188/344 |
| 2015/0001018 A1* | 1/2015 | Kariyama | B62L 3/023 188/344 |
| 2015/0274252 A1* | 10/2015 | Nishino | B62L 3/023 92/161 |

FOREIGN PATENT DOCUMENTS

| | | |
|---|---|---|
| CN | 101219698 A | 7/2008 |
| CN | 102730133 A | 10/2012 |
| EP | 0853036 A1 | 7/1998 |
| EP | 1473220 A1 | 11/2004 |
| EP | 2615020 A2 | 7/2013 |
| JP | 08318888 A | 12/1996 |
| JP | 10175584 A | 6/1998 |
| JP | 2002166874 A | 6/2002 |
| JP | 2003072669 A | 3/2003 |
| JP | 2003072670 A | 3/2003 |
| JP | 2004352236 A | 12/2004 |
| JP | 2005153864 A | 6/2005 |
| JP | 2005350053 A | 12/2005 |
| JP | 2007230553 A | 9/2007 |
| JP | 3181557 | 2/2013 |
| JP | 3182210 | 3/2013 |

OTHER PUBLICATIONS

Office Action for Japanese Application No. 2014-234650, dated Feb. 20, 2018, with English translation.
Office Action for Chinese Application No. 201410669811.0, dated Feb. 24, 2018, with English translation.
Chinese Office Action dated Mar. 2, 2020 in Chinese Application No. 201410669811.0 with English translation.

* cited by examiner

INTEGRATED DRIVE FOR BICYCLE HANDLEBARS

CROSS REFERENCE TO RELATED APPLICATION(S)

This application claims the benefit of Italian Application No. MI2013A001933, which was filed on Nov. 20, 2013, and is incorporated herein by reference as if fully set forth.

FIELD OF INVENTION

The present invention concerns an integrated drive for bicycle handlebars; in the technical field of bicycle equipment, by integrated drive it is normally meant a single drive that comprises both means for driving a brake, and means for driving a gearshift of a bicycle.

BACKGROUND

In modern bicycles, in particular high performance ones, there is increasing use of oil-hydraulic actuators and electric actuators.

In particular, disc brake systems are known, in which braking is obtained by means of the closing of calipers on the discs; the force necessary to obtain adequate braking by means of closing calipers on the discs is produced by an oil-hydraulic group, for which reason these braking systems are commonly called hydraulic brakes. More specifically, by acting manually on a brake lever a piston is actuated that places oil under pressure inside a cylinder. The pressurised oil is then transferred through suitable tubes to the brake calipers, to obtain braking.

The use of the aforementioned hydraulic brakes makes it possible to improve the performance of the bicycle, ensuring safe and powerful braking. However, the drives for the actuators of these systems are generally bulky, to the extent as to often be undesirable to the most demanding users.

The Applicant has reduced the overall bulk by making an integrated drive, which comprises both the means for driving a hydraulic brake and the means for driving a gearshift in a single body.

SUMMARY OF THE INVENTION

The present invention concerns an integrated drive. More specifically, the integrated drive for bicycle handlebars according to the invention comprises a grip body having a shape and size suitable for being gripped by the cyclist in a holding condition while riding, a brake lever carried by the grip body, a hydraulic system mounted inside the grip body and actuated mechanically by the brake lever to send pressurised fluid into a braking system, and a set of gearshift drives, on said grip body.

Such a drive, which encloses in the same grip body not only all what is needed to drive the hydraulic brake, but also drives for the gearshift, allows the overall bulk to be significantly reduced. Moreover, it also allows a simplification of the assembly operations of the handlebars, since the driving functions of two systems, the braking system and the speed gear, can be included in a single drive.

BRIEF DESCRIPTION OF THE DRAWING(S)

Further characteristics and advantages of the invention will become clearer from the following description of a preferred embodiment of an integrated drive according to the invention, made with reference to the attached drawings. In such drawings:

FIG. 1 is a transparent perspective view of an integrated drive according to a first embodiment of the invention;

FIG. 1*a* is an enlargement of a part of FIG. 1;

DETAILED DESCRIPTION OF THE PREFERRED EMBODIMENT(S)

Figure 1:
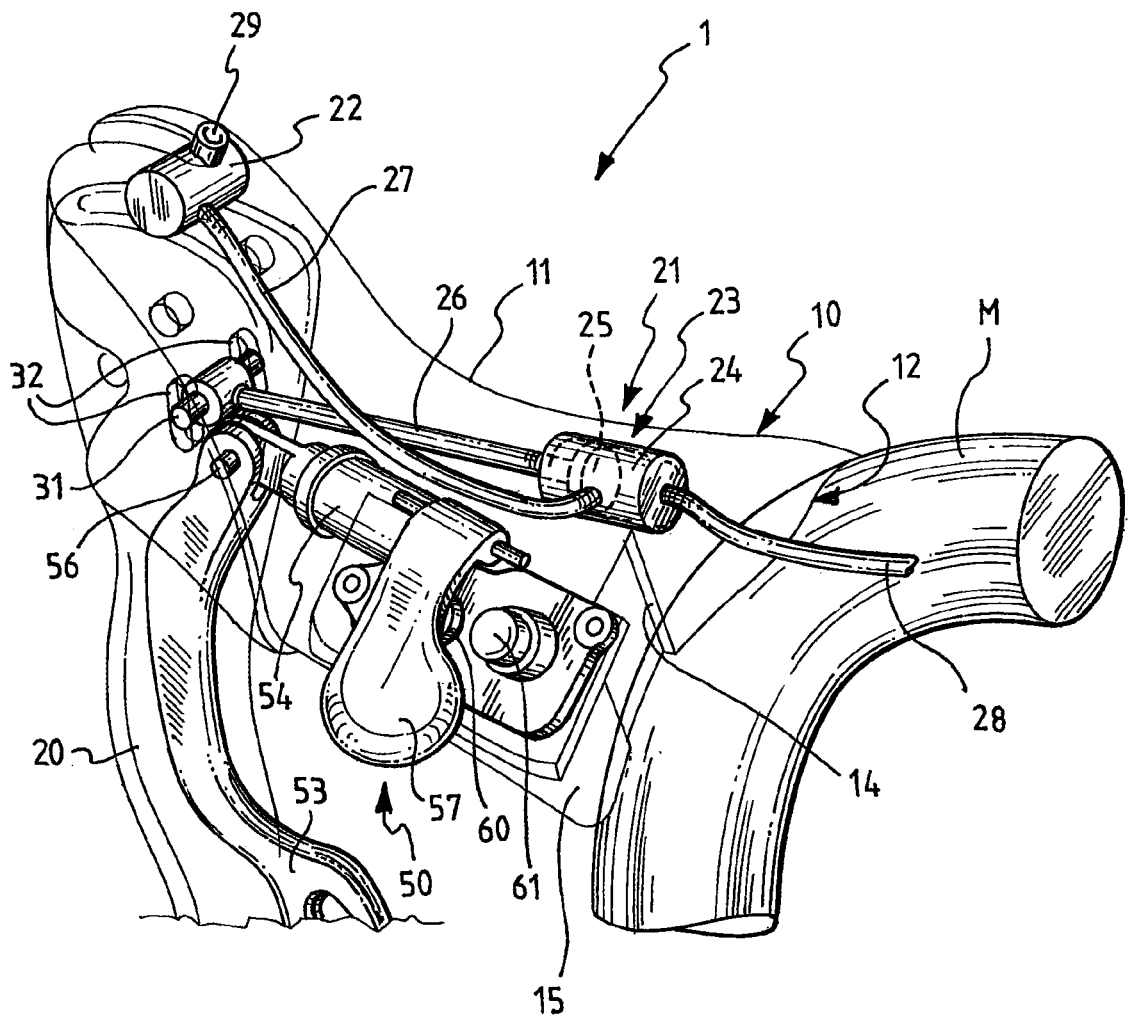
Figure 1A:
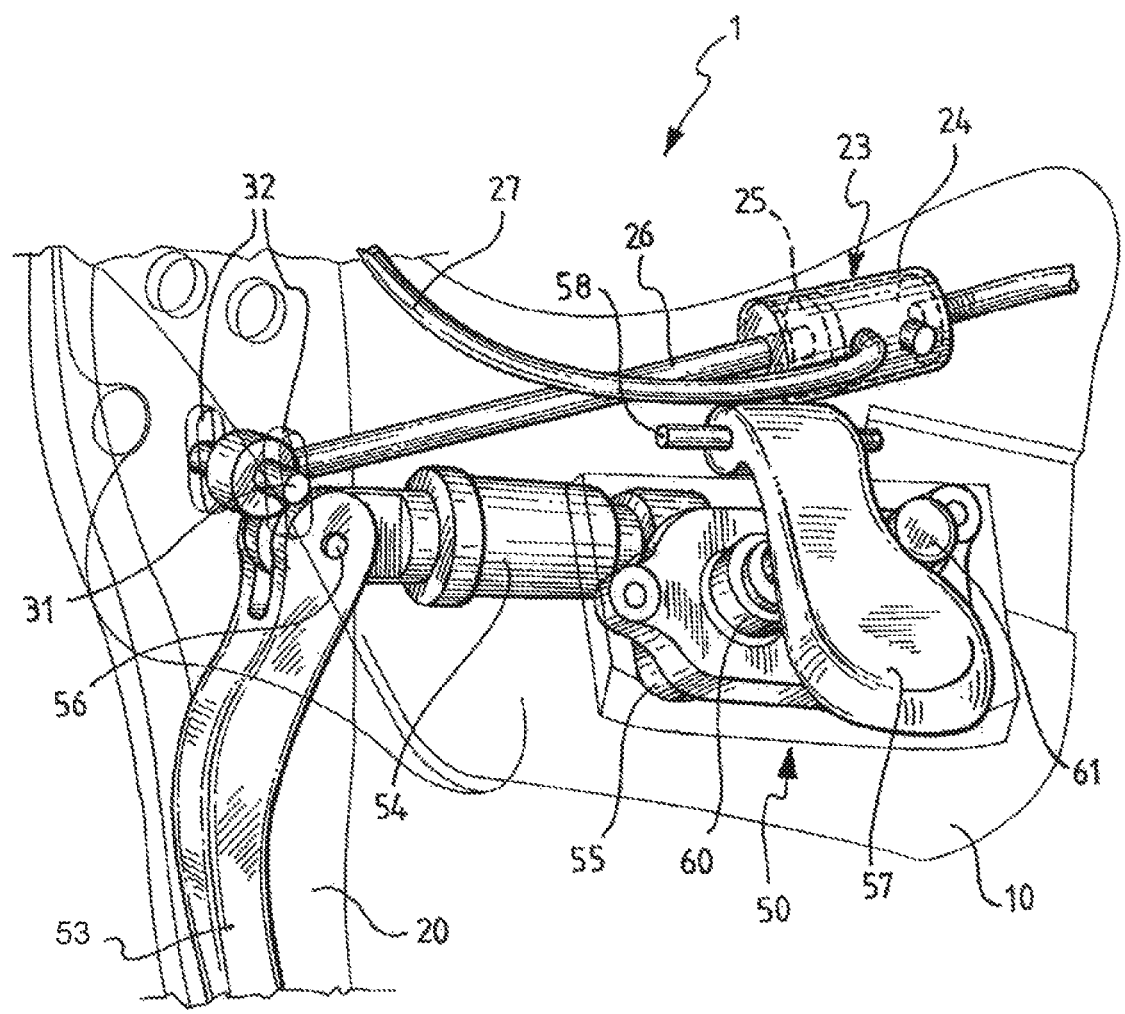

An integrated drive is provided that includes a grip body having a shape and size suitable for being gripped by the cyclist in a holding condition while riding, a brake lever carried by the grip body, a hydraulic system mounted inside the grip body and actuated mechanically by the brake lever to send pressurised fluid into a braking system, and a set of gearshift drives, on said grip body.

Preferably, the set of gearshift drives comprises an upward gearshifting drive and a downward gearshifting drive for the same gearshift, front or rear.

Preferably, the set of gearshift drives comprises electric gearshift drives.

Preferably, the set of gearshift drives comprises an electric switch actuated by a gearshift lever.

In a preferred embodiment, the electric switch is arranged inside the grip body and the gearshift lever is mounted on the grip body in a position substantially parallel to the brake lever, able to be actuated angularly in a direction substantially perpendicular to the direction of actuation of the brake lever.

In another preferred embodiment, the electric switch is arranged on a side of the grip body and the gearshift lever is mounted on the grip body, along said side.

Preferably, the integrated drive comprises a mounting strap for mounting on the handlebars, incorporated in the grip body. This characteristic also contributes to reducing bulk; moreover, it promotes a better aerodynamic configuration, which is particularly important for racing bicycles.

Preferably, the hydraulic system is an oil-hydraulic system and comprises a cylinder-piston group with a stem of the piston mechanically connected to the brake lever, so that an actuation of the brake lever corresponds to sliding of the piston inside the cylinder. This direct actuation helps both to keep bulk down and to make actuation more efficient.

In order to avoid the aforementioned mechanical connection involving the deformation of the stem of the piston (or of other parts), it is preferable that there is at least one degree of freedom between brake lever and piston or between the cylinder-piston group and the grip body.

In a preferred embodiment, the integrated drive comprises a head of the stem of the piston engaged with at least one slot formed on the brake lever.

In a preferred embodiment, the integrated drive comprises a head of the stem of the piston hinged to the brake lever.

In a preferred embodiment, the cylinder-piston group is mounted fixed in the grip body.

In a preferred embodiment, the cylinder-piston group is mounted oscillating in the grip body, by means of a pin.

Preferably, the integrated drive comprises a tank of fluid for the cylinder-piston group, housed inside the grip body. The presence of the tank on board the grip body also adds to the overall bulk reduction.

In the Figures, reference numeral 1 wholly indicates an integrated drive according to the invention. The integrated drive 1 is intended to be mounted on one of the ends of bicycle handlebars M (shown partially only in FIGS. 1 and 2 together with the first embodiment of the invention), to drive a hydraulic brake and a derailleur of the bicycle; the handlebars M are of the type with curved ends. Normally, two integrated drives 1 will be mounted on the handlebars M, at the two opposite ends, so as to drive the two brakes (front and rear) and the two derailleurs (front and rear) of the bicycle.

The integrated drive 1 comprises a grip body 10, which has a shape and size such as to be able to be gripped by the cyclist while riding the bicycle. The grip body 10 comprises a hollow casing 11 provided with a rear face 12 on which to rest and fix to the handlebars M.

The integrated drive 1 comprises a strap 13 for mounting on the handlebars M. The strap 13 is arranged in a suitable seat 14 formed on the grip body 10 close to the rear face 12, so as to wrap around the handlebars M and to be able to be closed on it, locking the handlebars M against the face 12. It should be noted that the strap 13, although provided in both of the embodiments of the invention shown, is not illustrated in FIGS. 1-2 of the first embodiment (nor in FIG. 3 of the second embodiment).

The grip body 10, in a remote position with respect to the face 12, has a brake lever 20 hinged to it according to a hinging axis A. The axis A—with respect to the direction of forward motion of the bicycle on the handlebars M of which the integrated drive 1 is mounted—is arranged horizontal and transversal.

Inside the grip body 10 of the integrated drive 1, a hydraulic system 21 is mounted, actuated mechanically by the brake lever 20 to send pressurised fluid in a braking system of the bicycle. In one embodiment, the hydraulic system 21 is an oil-hydraulic system. More specifically, the hydraulic system 21 comprises a tank 22 for collecting operative fluid (typically oil, not shown in the drawings) and a cylinder-piston group 23 for the pressurisation of the operative fluid, in turn comprising a cylinder 24 and a piston 25, able to slide in a sealed manner in the cylinder 24 and provided with a stem 26. The cylinder 24 is mounted fixed in the grip body 10, but it could also be mounted hinged to the grip body 10, in an embodiment that is not illustrated. The hydraulic system 21 also comprises a supply tube 27 of non-pressurised operative fluid between the tank 22 and the cylinder-piston group 23 and a delivery tube 28 of pressurised operative fluid coming out from the cylinder-piston group 23 and intended for a braking system of the bicycle. The tank 22 is provided with an opening 29 for fluid filling. It should be noted that the tank 22, as well as its opening 29 and the tubes 27 and 28, even if provided in both of the embodiments of the invention shown, are not illustrated in FIGS. 3-5 of the second embodiment.

The stem 26 is mechanically connected to the brake lever 20, so that an actuation of the brake lever 20 corresponds to sliding of the piston 25 inside the cylinder 24. The characteristics of this connection are slightly different in the different embodiments of the invention, according to FIGS. 1-2 and 3-5, respectively; in FIGS. 1-2 and 3-5, elements that are the same or corresponding (both those described above and those that will be described hereafter) are marked with the same reference numerals and are described only once.

Figure 2:
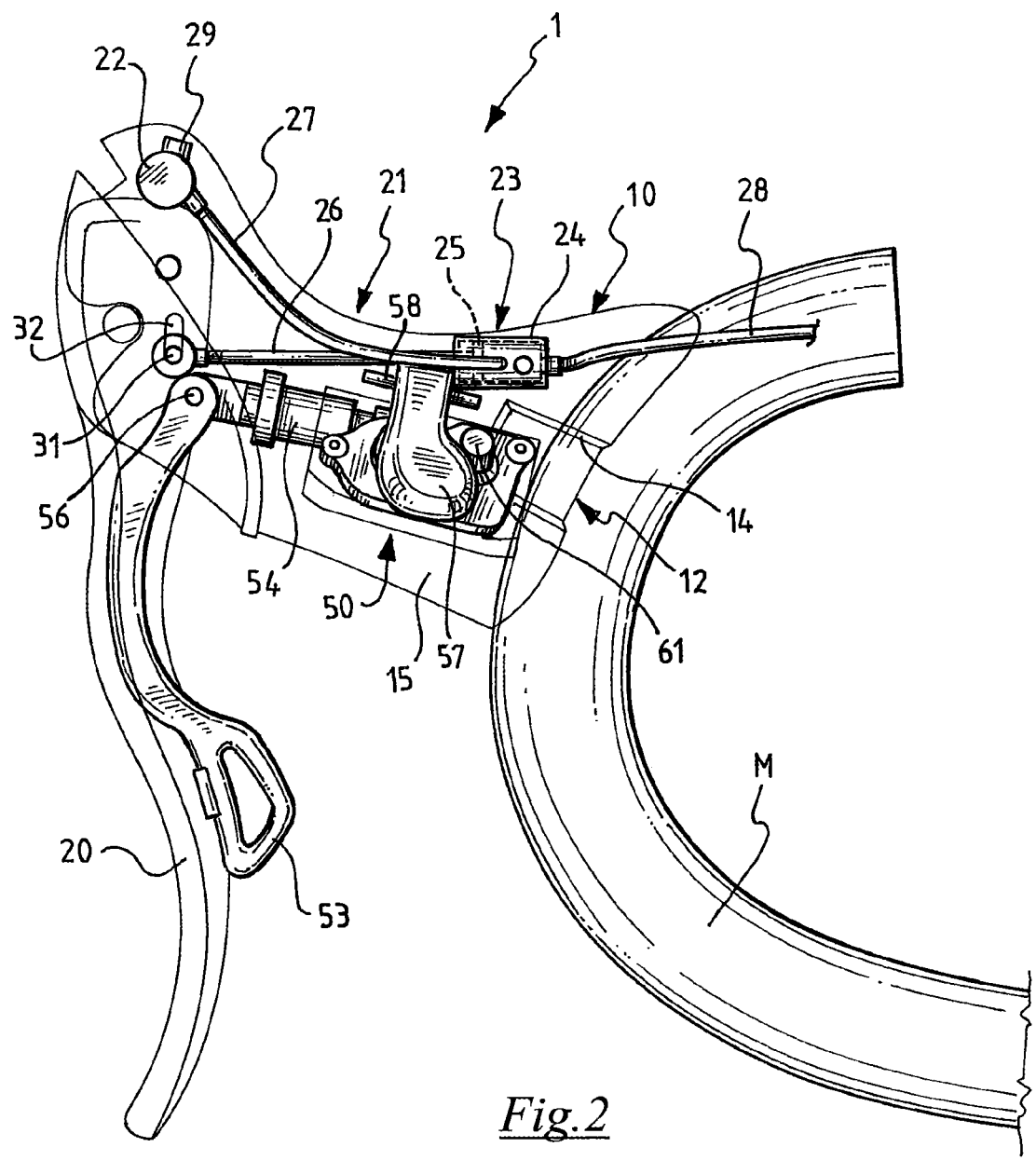
FIG. 2 is a transparent side view of the integrated drive of FIG. 1.

In the embodiment of FIGS. 1-2, the stem 26 is provided with a head 31, formed by a transversal pin, engaged in slots 32 formed in the brake lever 20, so that each angular displacement of the brake lever 20 corresponds to sliding of the stem 26 and with it of the piston 25 in the cylinder 24, together with sliding of the head 31 in the slots 32.

Figure 3:
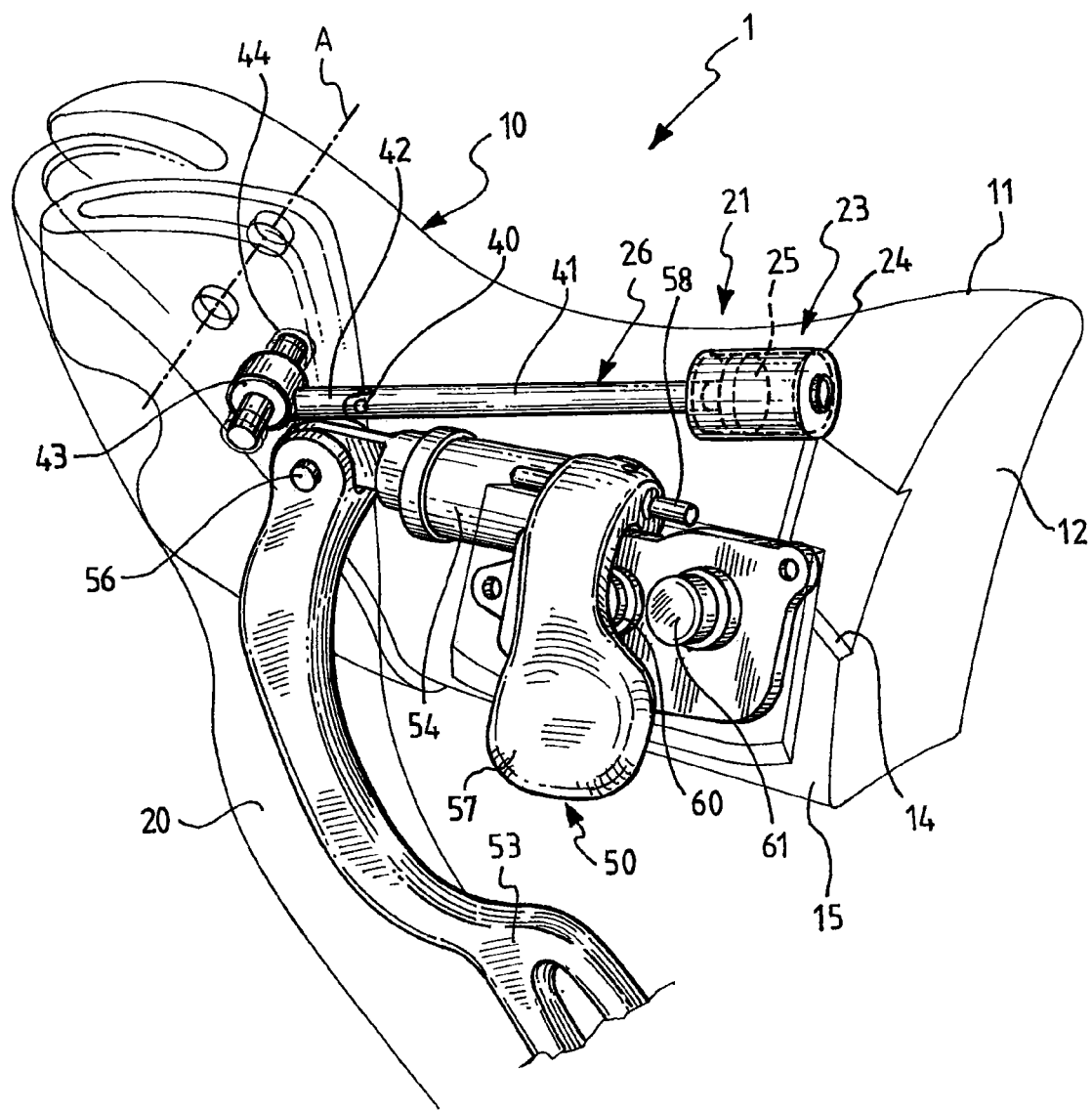
FIG. 3 is a transparent perspective view of an integrated drive according to a second embodiment of the invention.
Figure 4:
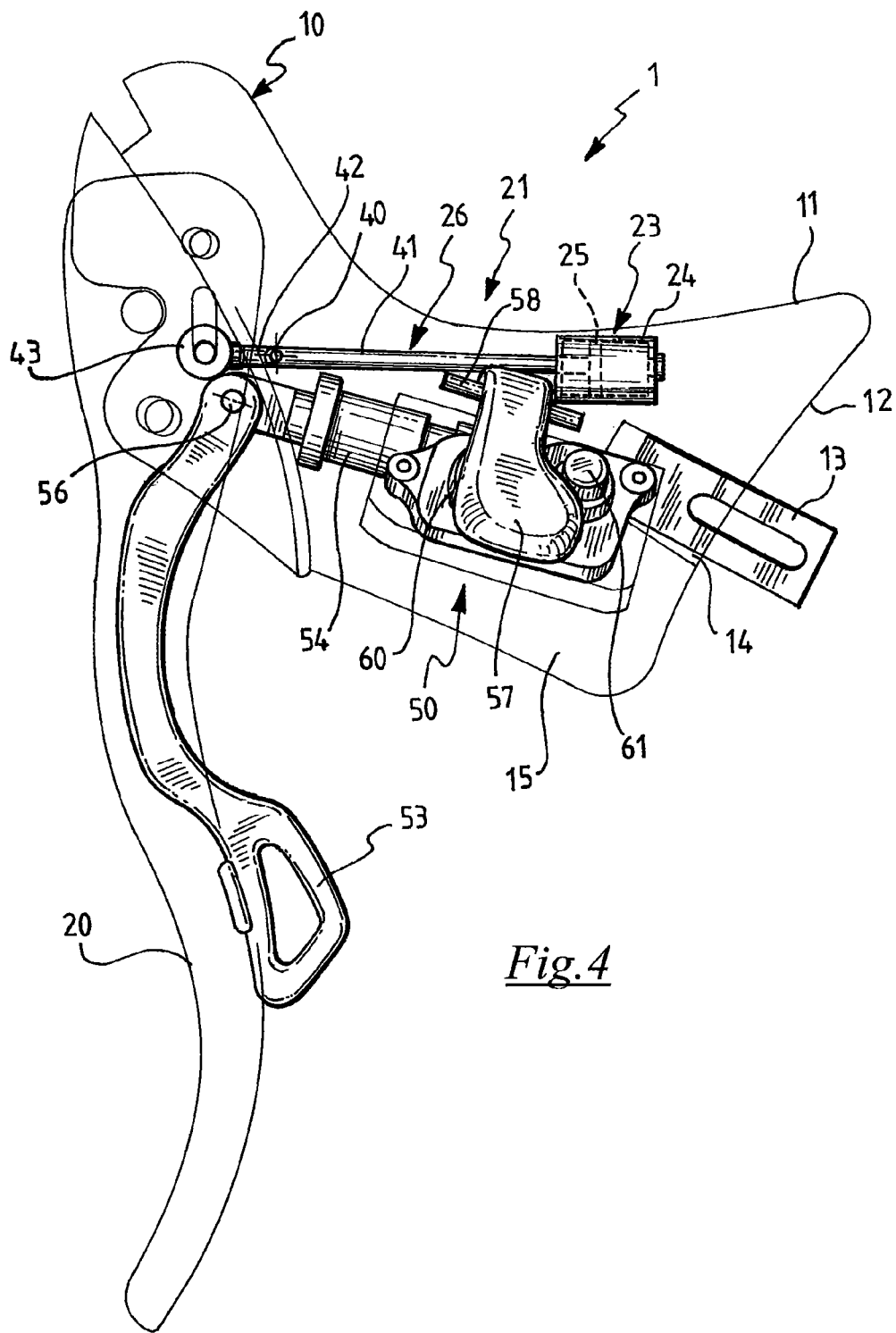
FIG. 4 is a transparent side view of the integrated drive of FIG. 3.
Figure 5:
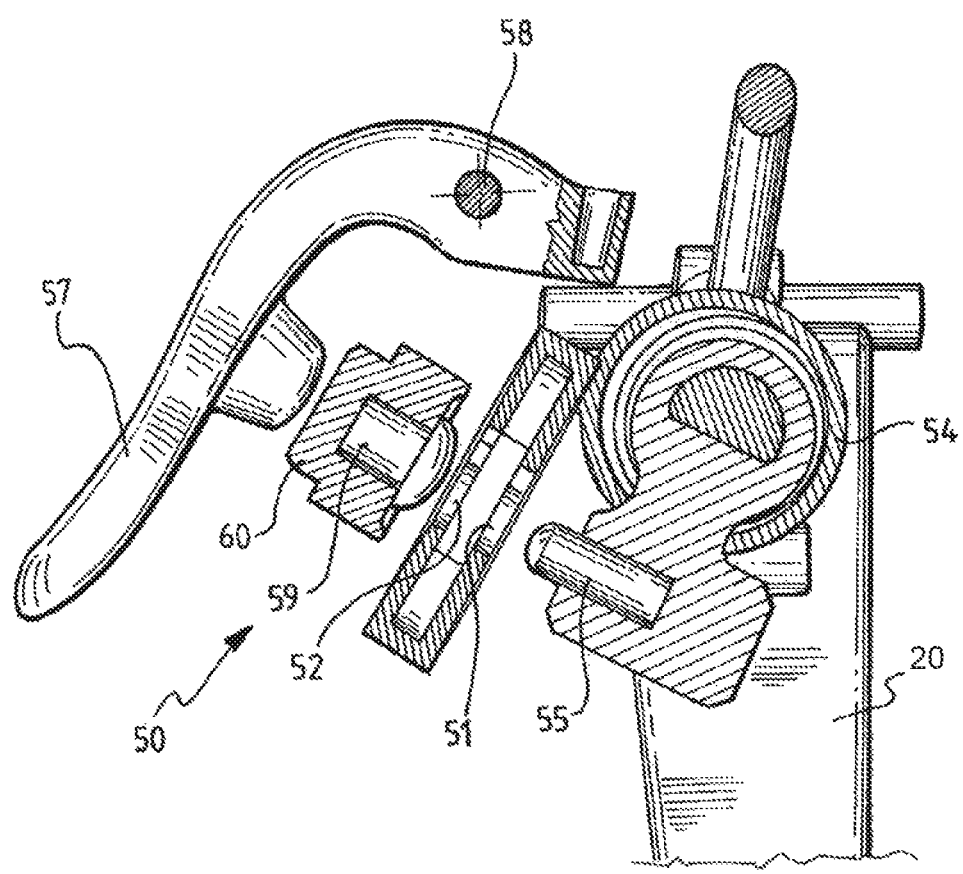
FIG. 5 is a schematic cross section view of some elements of the integrated drive of FIG. 3.

In the embodiment of FIGS. 3-5, the stem 26 is provided with a joint 40, which divides the stem 26 into a first portion 41 fixedly connected to the piston 25 and a second portion 42 provided with a head 43, formed by a transversal pin, engaged in a hole 44 formed in the brake lever 20, so that each angular displacement of the brake lever 20 corresponds to sliding of the stem 26 and with it of the piston 25, together with a variation of the angle between the axis of the first portion 41 and that of the second portion 42 of the stem 26.

The integrated drive 1 also comprises, in both of the illustrated embodiments, a set of gearshift drives 50, on the grip body 10.

The set of gearshift drives 50 comprises electric gearshift drives, more specifically an electric switch 51 for downward gearshifting and an electric switch 52 for upward gearshifting, both of the button type, i.e. such as to be actuated by pressing, in contrast to inner elastic means (not shown in the Figures).

The electric switches 51 and 52 are actuated by respective gearshift levers.

More precisely, the electric switch 51 is housed inside the grip body 10 and is actuated by a gearshift lever 53, which is mounted on the grip body 10 in a position substantially parallel to the brake lever 20. The gearshift lever 53 sets a primary pin 54 in rotation, which in turn carries a striker arm 55 that acts in compression on the switch 51, when the gearshift lever 53 is actuated angularly in the direction perpendicular to the direction of actuation of the brake lever 20; when, on the other hand, the gearshift lever 53 is actuated angularly together with the brake lever 20, in its same direction of actuation, the gearshift lever 53 moves angularly on a secondary transversal pin 56 (with which it is mounted on the primary pin 54) without making the primary pin 54 rotate and therefore without actuating the electric switch 51.

The electric switch 52, on the other hand, faces externally onto a side 15 of the grip body 10 and is actuated by a gearshift lever 57, which is mounted on the grip body 10 along the side 15, hinged through a pin 58 arranged parallel to the side 15. The gearshift lever 57 is arranged above the electric switch 52, so as to actuate it through a striker 59 covered by a deformable capsule 60, when the gearshift lever 57 is actuated by pressing it on the side 15 of the grip body 10.

The gearshift drives 50 also comprise a button 61, housed on the side 15 near to the switch 52, for programming and setting the operating modes of the electric gearshift.

The operation of the integrated drive 1 can clearly be seen from what has been described above. The cyclist, while riding, grips the handlebars M, holding the curved end thereof or the grip body 10; in both cases, the cyclist can reach and actuate with his fingers both the brake lever 20 and the gearshift drives 50, i.e. the gearshift levers 53 and 57.

An actuation of the cyclist on the brake lever 20 determines the sliding of the piston 25 and the compression of operative fluid in the cylinder 24; the pressurised operative fluid is pushed into the delivery tube 28 towards a hydraulic brake (not illustrated).

An actuation of the cyclist on the gearshift levers 53 or 57 determines the actuation of the electric switches 51 or 52 and consequently the activation of an electric derailleur to obtain upward or downward gearshifting.

As can be seen, thanks to the invention the cyclist has both a hydraulic brake and an electric gearshift available to him, with a single integrated drive the bulk of which is limited to the grip body 10. Moreover, each actuation, both of the brake and of the gearshift, can be carried out without having to remove one's hand from the grip, on the handlebars M or on the grip body 10.

In addition to the aforementioned advantages of minimal bulk and easy actuation, it should also be noted that, with an integrated drive according to the invention, the hydraulic system remains in protected position, inside the grip body 10.

What is claimed is:

1. An integrated drive for bicycle handlebars comprising:
    a grip body having a shape and size suitable for being gripped by a cyclist in a holding condition while riding,
    a brake lever carried by the grip body, and
    a hydraulic system mounted inside the grip body and mechanically actuated by the brake lever to send pressurized fluid into a braking system, the hydraulic system includes a stem having a first stem portion with a fixed connection to a piston and a second stem portion hinged to the brake lever, and the first stem portion and the second stem portion are connected by a joint,
    whereby the piston is mechanically connected to the brake lever and actuation of the brake lever moves the piston inside a cylinder such that the first stem portion is arranged partially outside of the cylinder, and the joint flexes between the first stem portion and the second stem portion, and the joint is arranged entirely outside of the cylinder.
2. The integrated drive according to claim 1, further comprising a set of gearshift drives on said grip body, wherein the set of gearshift drives comprises an upward gearshifting drive and a downward gearshifting drive for a same gearshift, front or rear.
3. The integrated drive according to claim 1, further comprising a set of gearshift drives on said grip body, wherein the set of gearshift drives comprises electric gearshift drives.
4. The integrated drive according to claim 3, wherein the set of gearshift drives comprises an electric switch actuated by a gearshift lever.
5. The integrated drive according to claim 4, wherein the electric switch is arranged inside the grip body and the gearshift lever is mounted on the grip body in a position substantially parallel to the brake lever, able to be actuated angularly in a direction substantially perpendicular to a direction of actuation of the brake lever.
6. The integrated drive according to claim 4, wherein the electric switch is arranged on a side of the grip body and the gearshift lever is mounted on the grip body, along said side.
7. The integrated drive according to claim 1, comprising a mounting strap for mounting on the handlebars, incorporated in the grip body.
8. The integrated drive according to claim 1, wherein a head of the second stem portion of the jointed stem is engaged with at least one slot formed on the brake lever.
9. The integrated drive according to claim 1, wherein the hydraulic system is mounted fixed in the grip body.
10. The integrated drive according to claim 1, wherein the hydraulic system is mounted oscillating in the grip body by a pin.
11. The integrated drive according to claim 1, comprising a tank of fluid for the hydraulic system, housed inside the grip body.
12. The integrated drive according to claim 1, wherein the stem provides at least one degree of freedom between the brake lever and the piston.

* * * * *